(12) United States Patent
Gabara

(10) Patent No.: US 9,642,017 B2
(45) Date of Patent: May 2, 2017

(54) APPARATUS AND METHOD FOR IMPROVING THE INTEGRITY AND PERFORMANCE OF AN AD-HOC WIRELESS NETWORK

(75) Inventor: Thaddeus Gabara, Murray Hill, NJ (US)

(73) Assignee: TraskThings LLC, Murray Hill, NJ (US)

( * ) Notice: Subject to any disclaimer, the term of this patent is extended or adjusted under 35 U.S.C. 154(b) by 2515 days.

(21) Appl. No.: 11/681,158

(22) Filed: Mar. 1, 2007

(65) Prior Publication Data
US 2008/0212491 A1    Sep. 4, 2008

(51) Int. Cl.
| | | |
|---|---|---|
| *H04W 16/18* | (2009.01) | |
| *H04W 84/04* | (2009.01) | |
| *H04W 16/26* | (2009.01) | |
| *H04B 7/155* | (2006.01) | |
| *H04B 7/26* | (2006.01) | |
| *H04W 24/02* | (2009.01) | |
| *H04W 40/02* | (2009.01) | |
| *H04W 84/18* | (2009.01) | |

(52) U.S. Cl.
CPC ............ *H04W 16/26* (2013.01); *H04B 7/155* (2013.01); *H04B 7/2606* (2013.01); *H04W 24/02* (2013.01); *H04W 16/18* (2013.01); *H04W 40/02* (2013.01); *H04W 84/047* (2013.01); *H04W 84/18* (2013.01)

(58) Field of Classification Search
CPC ... H04W 24/02; H04W 4/008; H04W 84/047; H04W 88/04; H04W 16/18; H04W 72/08; H04W 24/08; H04W 40/02; H04W 84/18; H04W 16/26; H04B 7/155; H04B 7/2606
USPC .......... 455/402, 446–449, 552.1, 553.1, 423, 455/41.1–41.3; 370/338, 246, 247
See application file for complete search history.

(56) References Cited

U.S. PATENT DOCUMENTS

| | | | |
|---|---|---|---|
| 5,946,633 A * | 8/1999 | McAlinden | 455/551 |
| 6,243,413 B1 * | 6/2001 | Beukema | 375/222 |
| 6,253,060 B1 * | 6/2001 | Komara et al. | 455/9 |
| 6,751,455 B1 | 6/2004 | Acampora | |
| 6,788,953 B1 * | 9/2004 | Cheah et al. | 455/550.1 |
| 6,971,063 B1 * | 11/2005 | Rappaport et al. | 715/733 |
| 2002/0038153 A1 * | 3/2002 | Amodeo et al. | 700/1 |
| 2003/0045230 A1 * | 3/2003 | Weissman | 455/11.1 |
| 2005/0042999 A1 * | 2/2005 | Rappaport | 455/307 |
| 2006/0077968 A1 * | 4/2006 | Pitsoulakis et al. | 370/352 |

(Continued)

*Primary Examiner* — Daniel Lai
(74) *Attorney, Agent, or Firm* — Thaddeus Gabara

(57) ABSTRACT

Several transceivers can be combined together to form a relay which can be used to form an ad-hoc network. A computation unit within the ad-hoc network determines the best placement of a new relay to improve the link integrity of the network. Furthermore, a database of power outlets, their locations and whether they contain a relay or not can be utilized to determine a method to improve the links within the ad-hoc network by placing additional relays into unused power outlets. A control unit can be used to configure the transceivers of each relay to enhance data transfer within a given information flow path of the ad-hoc network. The stream of bits can be exchanged with a second stream of bits. The housing unit can also contain the power plugs molded into the unit to allow the unit to be easily inserted into an AC power wall outlet.

16 Claims, 8 Drawing Sheets

(56) References Cited

U.S. PATENT DOCUMENTS

2007/0054670 A1\* 3/2007 Kalika et al. ................. 455/446
2007/0127421 A1\* 6/2007 D'Amico et al. ............ 370/338

\* cited by examiner

|  | distance | bandwidth | Carrier Frequency |
|---|---|---|---|
| Bluetooth | 15m | 300-723Kb/s | 2.4 GHz |
| 802.11a | 15m | 22-54Mb/s | 5 GHz |
| 802.11b | 30m | 5.5-11Mb/s | 2.4 GHz |
| UWB-1 | 3m | 480Mb/s | 3.1-10.6 GHz |
| UWB-2 | 10m | 110Mb/s | 3.1-10.6 GHz |

FIG. 1

APPARATUS AND METHOD FOR IMPROVING THE INTEGRITY AND PERFORMANCE OF AN AD-HOC WIRELESS NETWORK

BACKGROUND OF THE INVENTION

Homes and businesses are continuing to become interconnected with higher bandwidth interfaces to provide real-time video. Video conferencing, multi-media, DVD, 3-D video systems for the users that are in the home and business premises.

One of the aspects of this higher bandwidth interface is the attempt to eliminate wired interconnect, and replace these interfaces with a wireless interconnect. One possible network is the ad-hoc network. In general, the ad-hoc network can handle the heavy bandwidth needs of the multiple users with the range of the network. The ad-hoc routes signals from client to client and from the internet to client. In addition, servers can be located within the network to provide local and immediate high bandwidth information.

However, as the bandwidth increases, the range of the wireless signal typically decreases. Thus, a way of inserting relays or multiple transceivers are required to maintain a high bandwidth coverage over a large networking range. Furthermore, it is desirable to locate these components near a power source.

BRIEF SUMMARY OF THE INVENTION

The present invention uses a computation unit within the network and a database to determine the best placement of a new relay to improve the link integrity of the ad-hoc network. The existing locations of the relays are in the database. The database also contains the power plug outlets that do not contain a relay. A computational unit can be used to determine the link integrity of the network and determine if the need exists to add another relay. Thus, a database of power outlets, their locations and whether they contain a relay can be utilized to determine a method to improve the links within the ad-hoc network.

U.S. Pat. No. 6,751,455 issued Jun. 15, 2004 to Acampora suggests a radio link management system for the home or business using agents (a relay with one transceiver) and clients. Acampora suggests the concept of adding agents to the network to improve the network. Furthermore, the agent or transceiver can be mounted in a wall AC power socket to get an unlimited supply of power. Once the agent has been inserted into the network, Acampora describes how the neighboring agents can incorporate the new agent into the network.

However, Acampora fails to describe the process of determining and positioning the new agent within the network. What Acampora does not mention is where to place this agent to improve the link integrity of the network. Also, Acampora does not mention the requirement for a database. This database contains the locations of unoccupied AC power wall outlets and wall outlets occupied by relays. In addition, Acampora does not mention that the agent for this invention can consist of a plurality of transceivers.

The relay of the new invention can contain two or more transceivers and a control unit that can be used to configure the transceivers. In addition, the relay can be molded into a housing unit and inserted directly into a power outlet. The control unit within this unit can be used to add a new relay into the network as well as controlling the transceivers to enhance data transfer within a given link or links of the ad-hoc network. The relay carries a bi-directional "stream of bits" using two transceivers at a given bandwidth, simultaneously. The stream of bits can be comprised of data bits, instruction bits, CRC bits, header packet information, control bits, and synchronizing signals, etc. Finally, the relay can exchange a first stream of bits within one transceiver with the stream of bits in a second transceiver within the same relay.

Integration of circuit components have allowed transceivers to benefit from a reduction in cost. Thus, sub 0.1 μm technology offers smaller and cheaper transceivers systems. Having two or more transceivers within a relay can be very cost effective.

The housing unit can also contain the power plugs molded into the unit to allow the unit to be easily inserted into a AC power wall outlet. These ideas are further described in the remainder of the specification.

BRIEF DESCRIPTION OF THE SEVERAL VIEWS OF THE DRAWINGS

FIG. 1 depicts a table illustrating the distance, bandwidth and carrier frequency of several Communication Standards.

DETAILED DESCRIPTION OF THE INVENTION

A table 1-1 of several Communication Standards (not an exhausted list) providing their distance, bandwidth and carrier frequency are given in FIG. 1. Bluetooth has a range of 15 m but the bandwidth is low <1 Mb/s. The 802.11a Standard has a range of 15 m with a bandwidth of up to 54 Mb/s. Note that 802.11b has a double the distance but the bandwidth decreases almost by 5. Finally, the UWB (Ultra Wideband) Standard illustrates a high bandwidth (~500 Mb/s) at 3 m. When the UWB distance is increased (3×), the bandwidth decreases almost 5× to 100 Mb/s. Hereafter, these and similar wireless Standards are referred to as the "Wireless Standards" while wired standards will be referred to as the "Wired Standards."

The relays that are used in this invention can have several Wireless Standards embedded on them. These Wireless Standards can be implemented as hardware, coded as software or altered by using a combination of the hardware and software. For example, the transceiver in the relay can be a software radio that can be configured to incorporate one of the Wireless Standards.

It is desirable to increase the range of the high bandwidth network such as UWB. The need exists to form an interconnected network comprising relays to allow a communication of stream of bits within the range of the home or business. Because the range of the UWB-1 is only 3 m in order to achieve a 500 Mb/s data rate, outlets need to be located within 3 m of each other to extend this bandwidth from one end of the home or business to the other end. One such network is the ad-hoc network.

Figure 2:
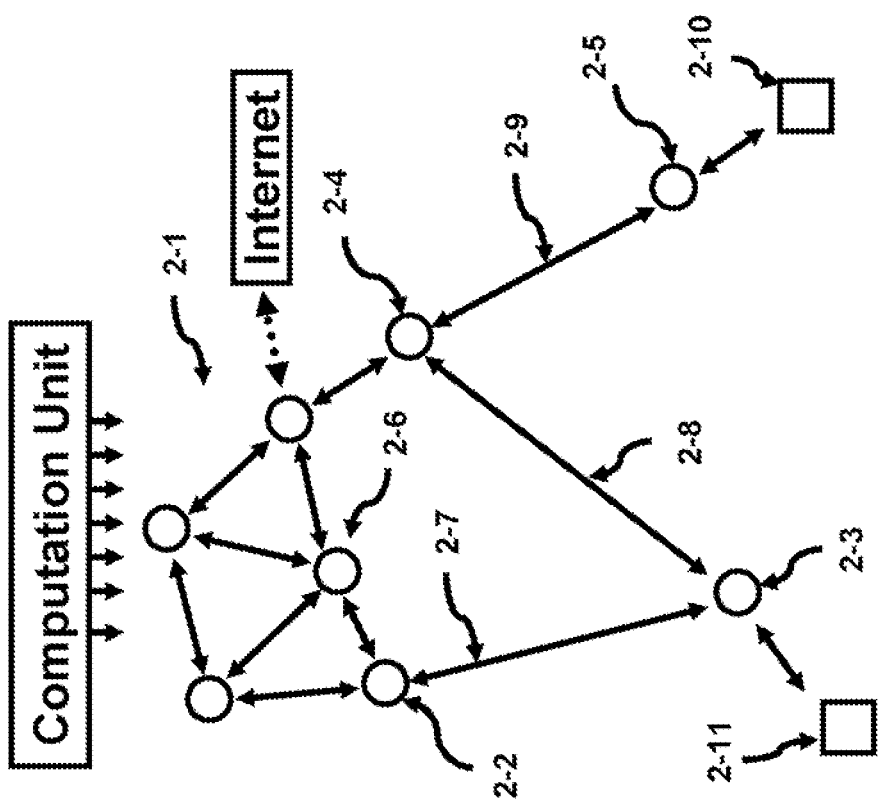
FIG. 2 illustrates an ad-hoc network along with a computational unit.

FIG. 2 illustrates an ad-hoc network 2-1 consisting of relays (circles), clients 2-10 and 2-11 (squares) and an internet connection. Clients are PC's, TV units, cameras, etc. The interconnecting paths called 2-7 through 2-9 have a long distance and have difficulty in transferring high bandwidth signals. The computation unit can be used to determine the placement of additional relays into the network to improve this situation. The decision that the computational unit makes can be displayed on a visual display found on a PC, PDA, cell phones, etc. The display can be LCD, plasma, CRT based.

In addition, a mobile device which is moved within this network can stay connected while the network. The computational unit automatically alters the characteristics of the network to improve the link integrity of the wireless connection. A link is the path formed between two relays. The link integrity can encompass the bit rate measurements between two relays, the power levels of the signals in a link, the level of modulation used in the link, and the frequency of transfer of the bits within the "stream of bits."

The computational unit can communicate to the wireless network using a variety of communication protocols. One Wired Standard, known as HomePNA uses the physical wires of the power network to establish a wired communication system. This Communication Standard would fall under the category of a "Wired Standards." These control signals can be applied to the network of FIG. 2 using the wired network of the power network that powers up the wireless network. These control signals can include the ability to adjust the connectivity, changing the frequency of operation, changing the Wireless Standard being used, finding the minimum bit error rate of all links, etc. Thus, the Communication Standard can include both the Wired and Wireless Communication Standards.

Another possibility is to restrict the control system of the computational unit to use one of the Wireless Standards to communicate with the network. In this case, at least one of the unused channels of a Wireless Standards can be used to reconfigure the network.

A third possibility is to de-centralize the Computational Unit and distribute the control to each of the wireless clients and relays which forms the network.

A fourth possibility is for the controls signals to propagate from the Computational Unit to the closest relays. These relays extract the instructions from the Computational Unit and store it in the relay's local memory. The instructions program these relays. The remaining instructions are sent to the closest set of first relays in the network which senses the control signal and latches it. The instructions program these next closest set of relays and retransmits the remaining instructions to the next closest set of second relays. This process continues until all relays in the network have been configured. Thus, there are a variety of ways the network of FIG. 2 can be configured.

Figure 3:
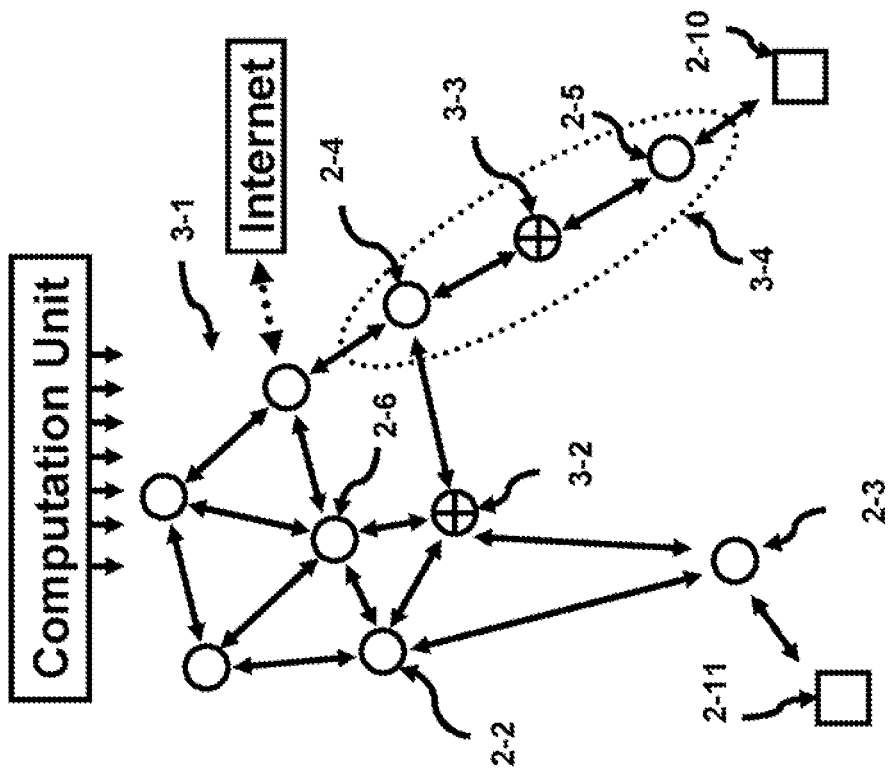
FIG. 3 illustrates an ad-hoc network with an improvement in several of the links in accordance with the present invention.

FIG. 3 illustrates the ad-hoc network 3-1 with the addition of two new relays 3-2 and 3-3. Note that many of the labeled relays still carry the names given in FIG. 2. The new links are specified using the relays at both ends of the link. For example, some of the new links in FIG. 3 are 3-2 and 2-2, 3-2 and 2-3, 3-2 and 2-6, 3-2 and 2-4, 3-3 and 2-4, and finally 3-3 and 2-5. Now the link integrity of these previous troubled links has been improved by inserting additional relays to allow higher wireless data rates to be transferred along these links.

Figure 4:
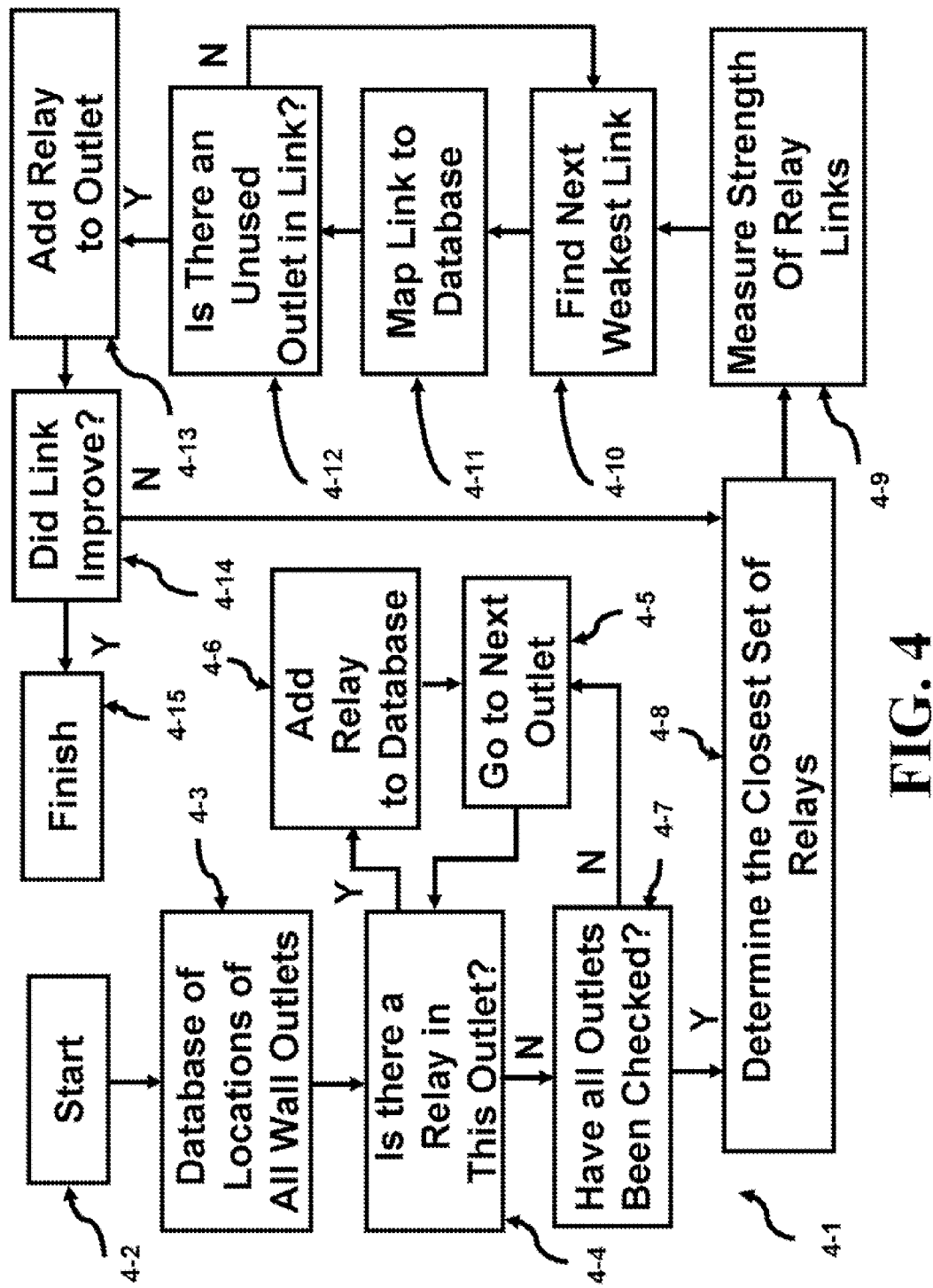
FIG. 4 shows a flowchart of improving the links in an ad-hoc network in accordance with the present invention.

FIG. 4 depicts a flow chart 4-1 that can be used to improve the links in an ad-hoc network. At the top left, is the block called "start" 4-2, which proceeds into the block "Database of locations of all wall outlets" 4-3 within the network, the next block "Is there a relay in this outlet?" 4-4 determines if the current outlet contains a relay. If it does "add relay to database" 4-6, if not, go to "Have all outlets been checked?" 4-7 then start "determining the closest set of relays" 4-8 with the minimum distance. The flow chart 4-1 continues with "Measure the strength of these links" 4-9, "find the weakest links" 4-10 and "map link to the database" 4-11. The weakest link can be determined by either a bit error rate test, received signal strength, or similar test. Then determine from the database "if there are any unused outlets in this latter link" 4-12. If there are none, go back to the step "Find the weakest link" 4-10. Otherwise, "add a relay to the outlet" 4-13. "Did the link improve?" 4-14. If not go back to the step "Determine the closest set of relays" 4-8, otherwise go to "finish" 4-15.

Figure 5:
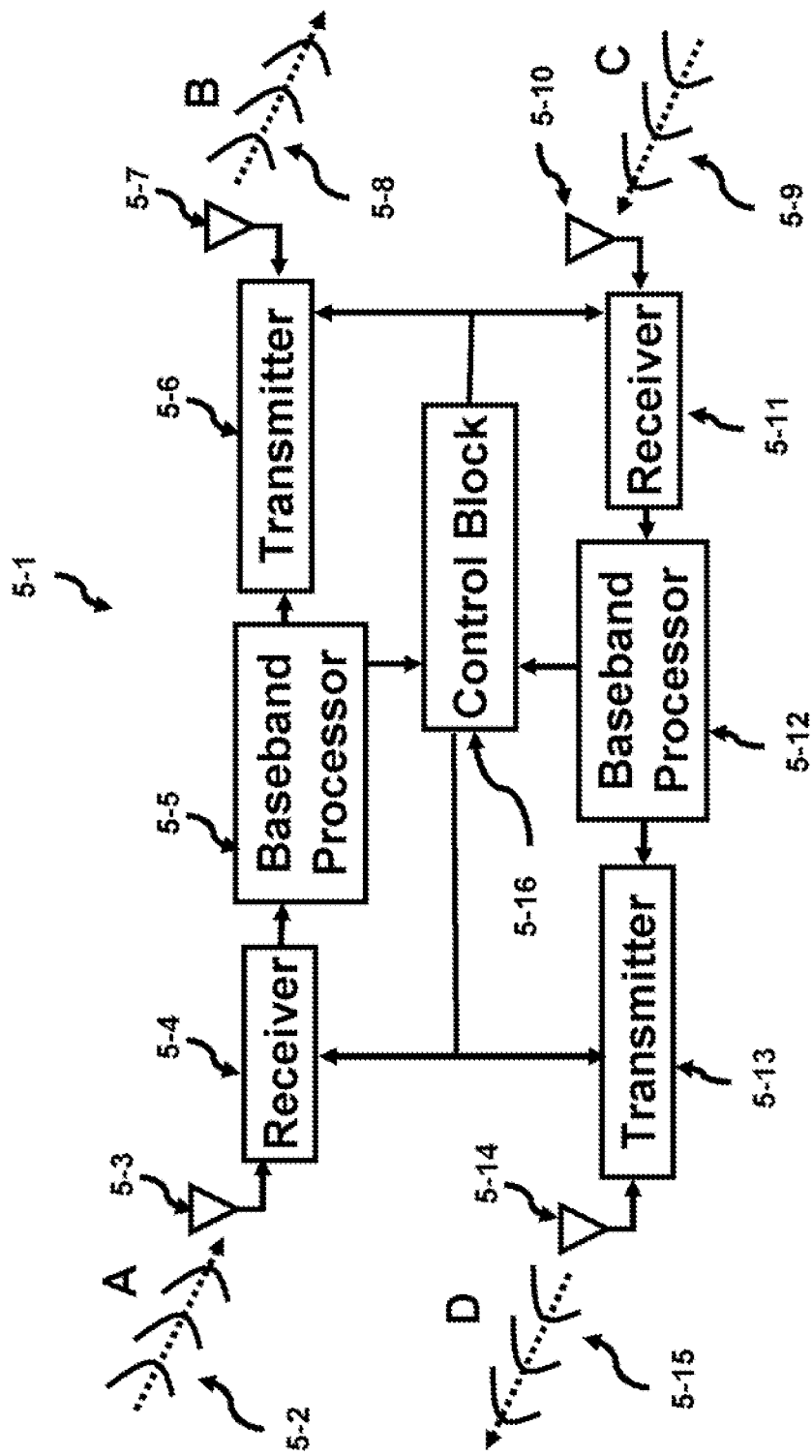
FIG. 5 depicts a relay consisting of two transceivers in accordance with the present invention.

A bock diagram of a relay 5-1 is illustrated in FIG. 5. A wireless signal A 5-2 arrives from the top left which the antenna 5-3 detects and applies to the receiver 5-4. The next block is the baseband processor block 5-5 which processes the signal A 5-2. The processor's result is then sent to the transmitter 5-6 which applies the signal to the antenna 5-7 and emits as wireless signal B 5-8. The first transceiver in the relay 5-1 starts with the antenna 5-3 and ends as the antenna 5-7. Thus, the relay 5-1 can carry and manipulate a stream of bits flowing from the first wireless signal A 5-2 to the wireless signal B 5-8. As mentioned earlier, the stream of bits can carries packets of data, protocol control signals, synchronization signals, etc.

A second stream of bits is provided in FIG. 5 comprising of; the wireless signal C 5-9 that is; picked up the antenna 5-10, sent to the receiver 5-11, processed by the baseband processor 5-12, applied to the transmitter 5-13 and send on antenna 5-15. This signal is then sent out as wireless signal D 5-15. Thus, the second transceiver consists of components 5-10 to 5-14. Note that this relay 5-1 can operate on two simultaneous streams of bits. This offers the ability to carry more content or bandwidth in a relay. The control block 5-16 is used to control how the relay 5-1 is configured.

Although FIG. 5 illustrates two separate stream of bits paths. Each flow path of the relay 5-1 is illustrated using separate components. However, this is not a requirement. For instance, one situation can be the joining of baseband processors 5-5 and 5-12 so that the processors are combined into one unit and the unit will time share between the flow paths.

In some systems, the carrier frequencies of the wireless signals A 5-2 and B 5-8 need to be different so that they do not interfere with each other. In other systems, the carrier frequency can be the same but the modulation techniques provide signal isolation (CDMA, Code Division Multiple Access, for instance).

This block diagram in FIG. 5 does not depict many of the components such as, the mixers, low noise amplifiers, A/D converters, D/A converters, filters, power supplies, etc. so that this block diagram can be simplified. Also, various digital component blocks are not shown: Veterbi and MAP decoders, memories, DSP, etc. Thus, the block diagram in FIG. 5 illustrates a simplified illustration of the relay 5-1. However, those skilled in the art would be able to reconstruct these block using at some of the above mentioned components.

Secondly, there may be a plurality of paths within each relay. Each path can be individually reconfigured by the control block.

As the carrier frequency increases; the physical size of the antenna decreases, while the propagation distance of the signal decreases. The first aspect mentioned above is very beneficial since it will be easier to place these antennae into a smaller package because of their size reduction.

Figure 6A:
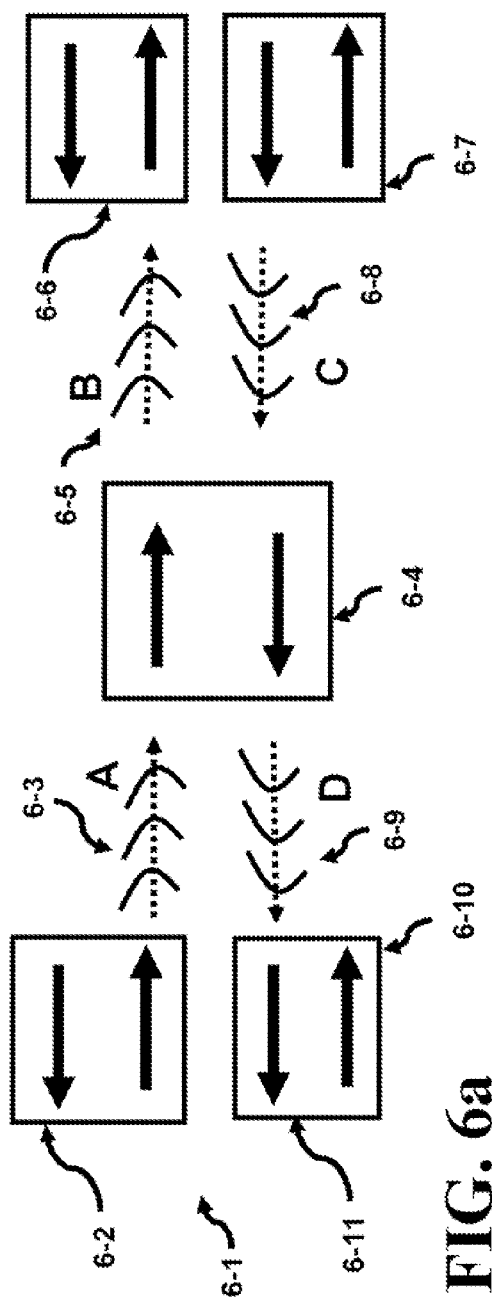
FIG. 6*a-b* illustrates two different configurations in accordance with the present invention.

FIG. 6a shows a first configuration 6-1 of the relay 5-1 that was illustrated in FIG. 5. The lower branch of the relay 6-2 generates signal A 6-3 and sends it to the relay 6-4. The upper branch of the relay 6-4 carries and generates the signal B 6-5. The lower branch of the relay 6-6 carries the stream of bits. Simultaneously, the upper branch of the relay 6-7 carries and generates the signal C 6-8 and sends it to the lower branch of the relay 6-4. The lower branch of the relay 6-4 carries and generates the signal D 6-9. The upper branch of the relay 6-11 carries the stream of bits. Note that if each solid arrow within the box carries a bandwidth of W in the flow paths, each box can carry a total bandwidth of 2 W.

Figure 6B:
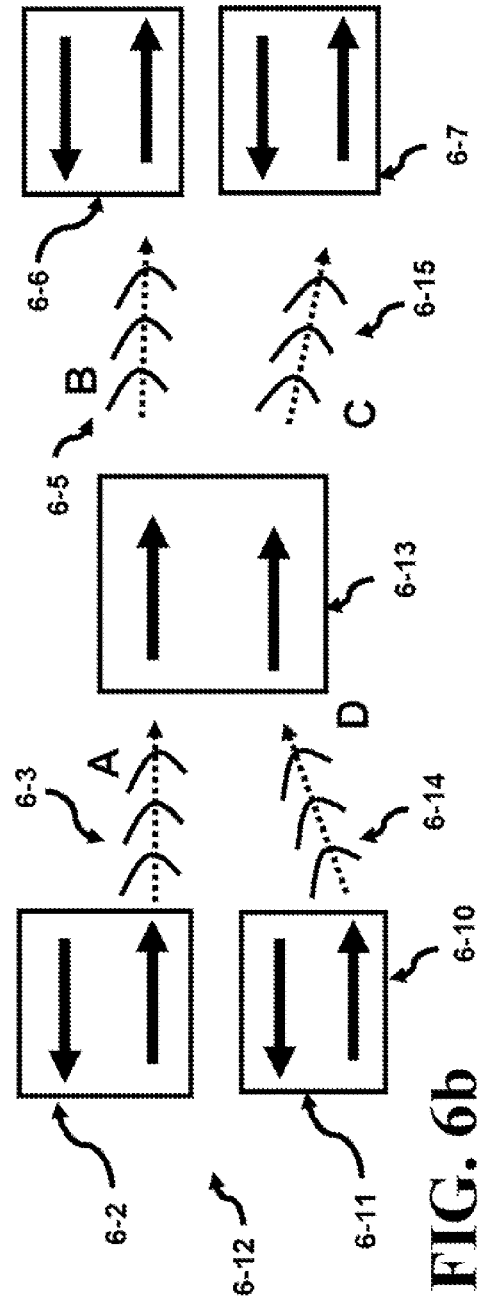

A second configuration 6-12 is illustrated in FIG. 6b and is almost the same as that given in 6-1. One difference between the configurations 6-1 and 6-12 is that the stream of bits flowing from the relay 6-11 to the relay 6-7 has been reversed. Thus, now both receivers pick up signals from the left and pass them to the right.

Note that the actual configuration of the relays 6-4 and 6-13 do not necessary have to be altered. For instance, if the carrier frequency of the transmitted signal D 6-9 is set equal to the carrier frequency of the transmitted signal C 6-15, and the carrier frequency of the received signal C 6-8 is set equal to the carrier frequency of the received signal D 6-14, then the relays 6-4 and 6-13 do not have to be modified.

Figure 7:
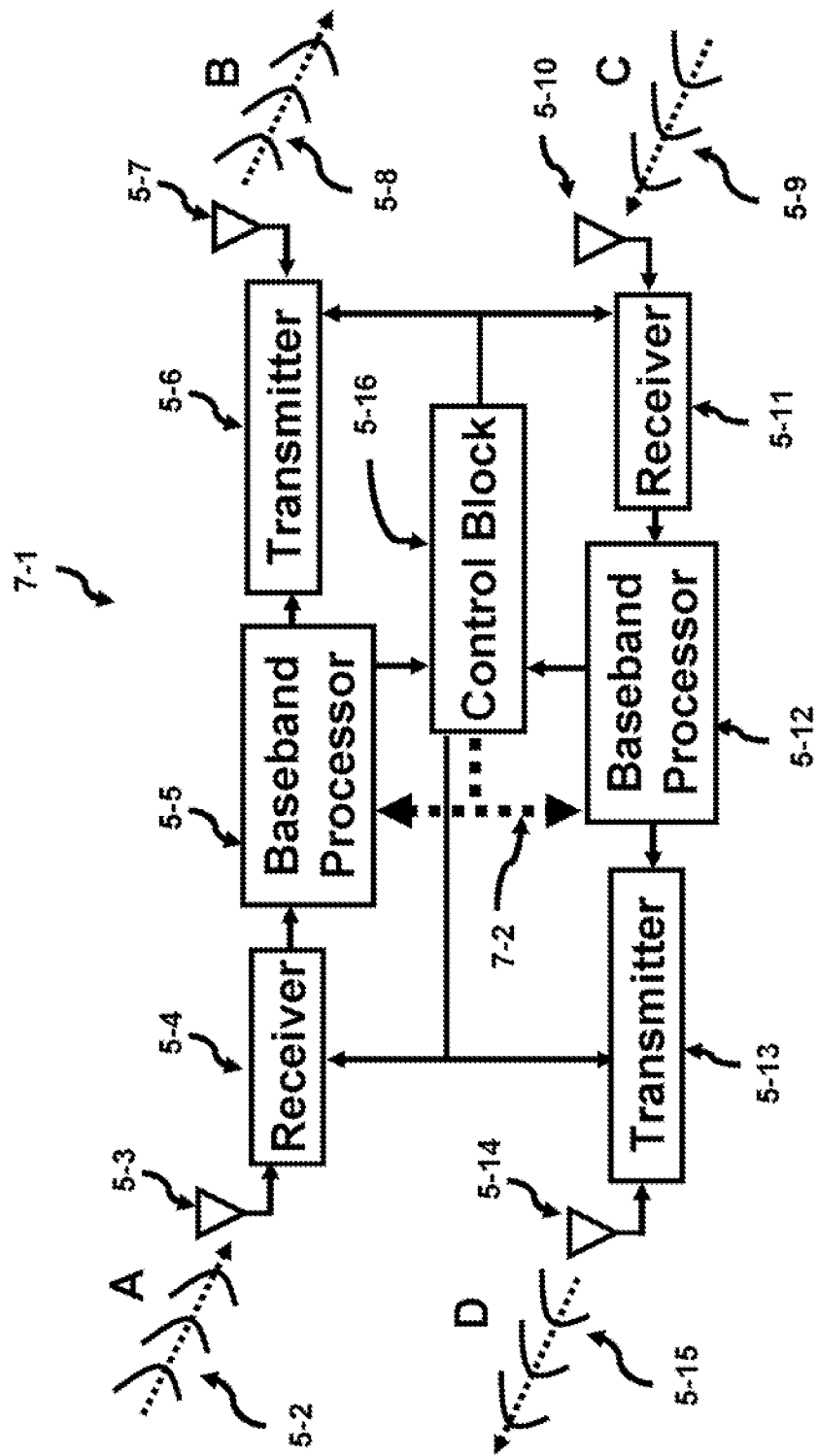
FIG. 7 illustrates a relay consisting of two transceivers transferring data between the two streams of bits in accordance with the present invention.

FIG. 7 illustrates a block diagram 7-1 which includes the ability to transfer portions of the stream of bits between the two transceivers. The control block is used in conjunction with memory to perform this function. Otherwise, this block diagram is very similar to the block diagram given in FIG. 5. This configuration can be used to perform diagnostics on the network. For example, a relay can be configured to perform a loopback configuration. That is, a first stream of bits in a first transceiver of a relay is sent back as a second stream of bits in a second transceiver in the same relay.

Figure 8:
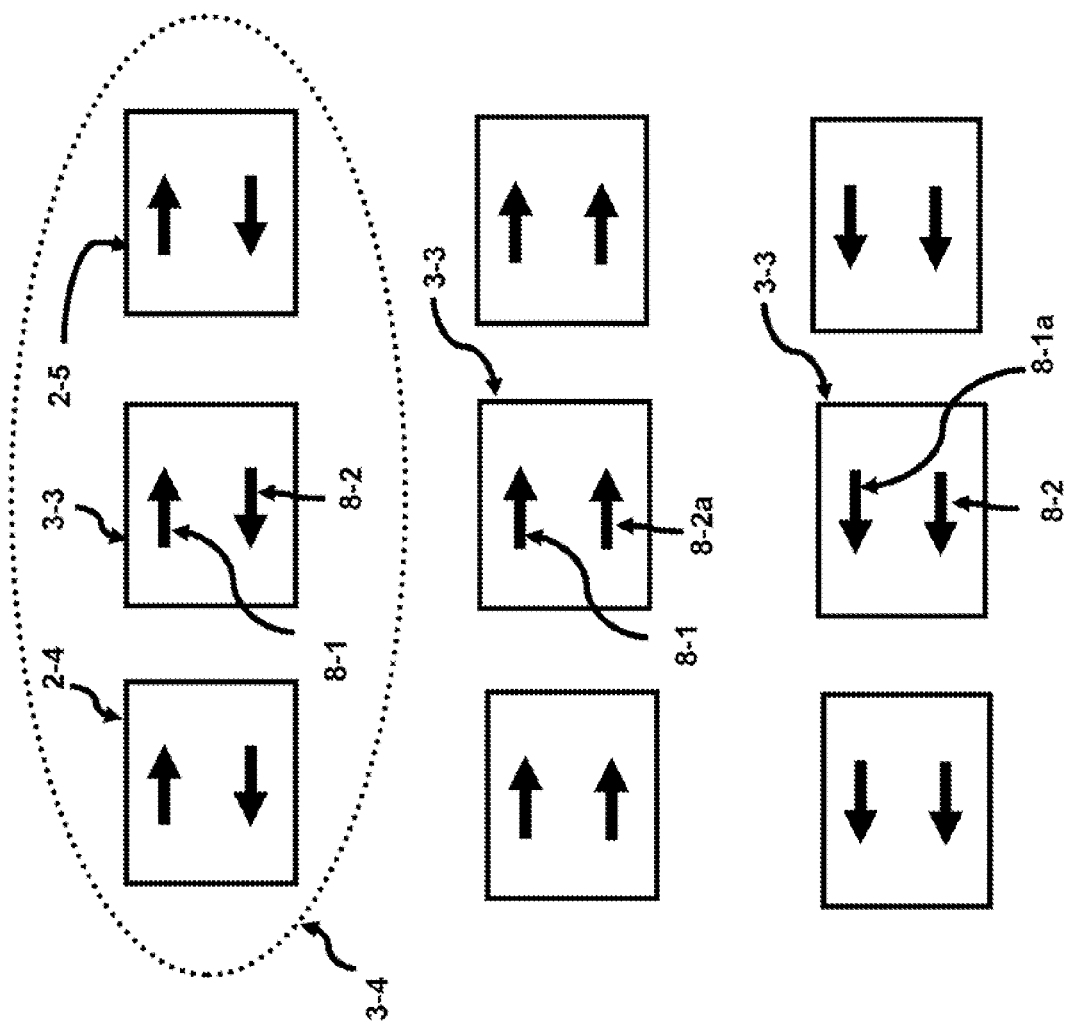
FIG. 8*a-c* shows a link being reconfigured as a full duplex and half duplex configurations in accordance with the present invention.

FIG. 8a-c depicts the link 3-4 of FIG. 3. The link consists of the original relays 2-4 and 2-5 and the addition of link 3-3 to improve the overall link performance. FIG. 8a shows the case where all relays operate in the full duplex mode. Thus, the two streams of bits can potentially have similar bandwidths simultaneously.

However, in some cases, a need may exist to operate in a half duplex mode either downstream or upstream. In this case, the bandwidth is doubled in the particular direction that has been chosen. This is illustrated in FIG. 8b and FIG. 8c, respectively. Thus, when the ad-hoc network desires to deliver a large amount of data to the client 2-10 in a short period of time, the transceivers are configured into a half duplex configuration as indicted in FIG. 8A. On the other and, when the client desires to deliver a large amount of data to the ad-hoc network, the half duplex mode can be used as indicted in FIGS. 8b and 8c.

Figure 9:
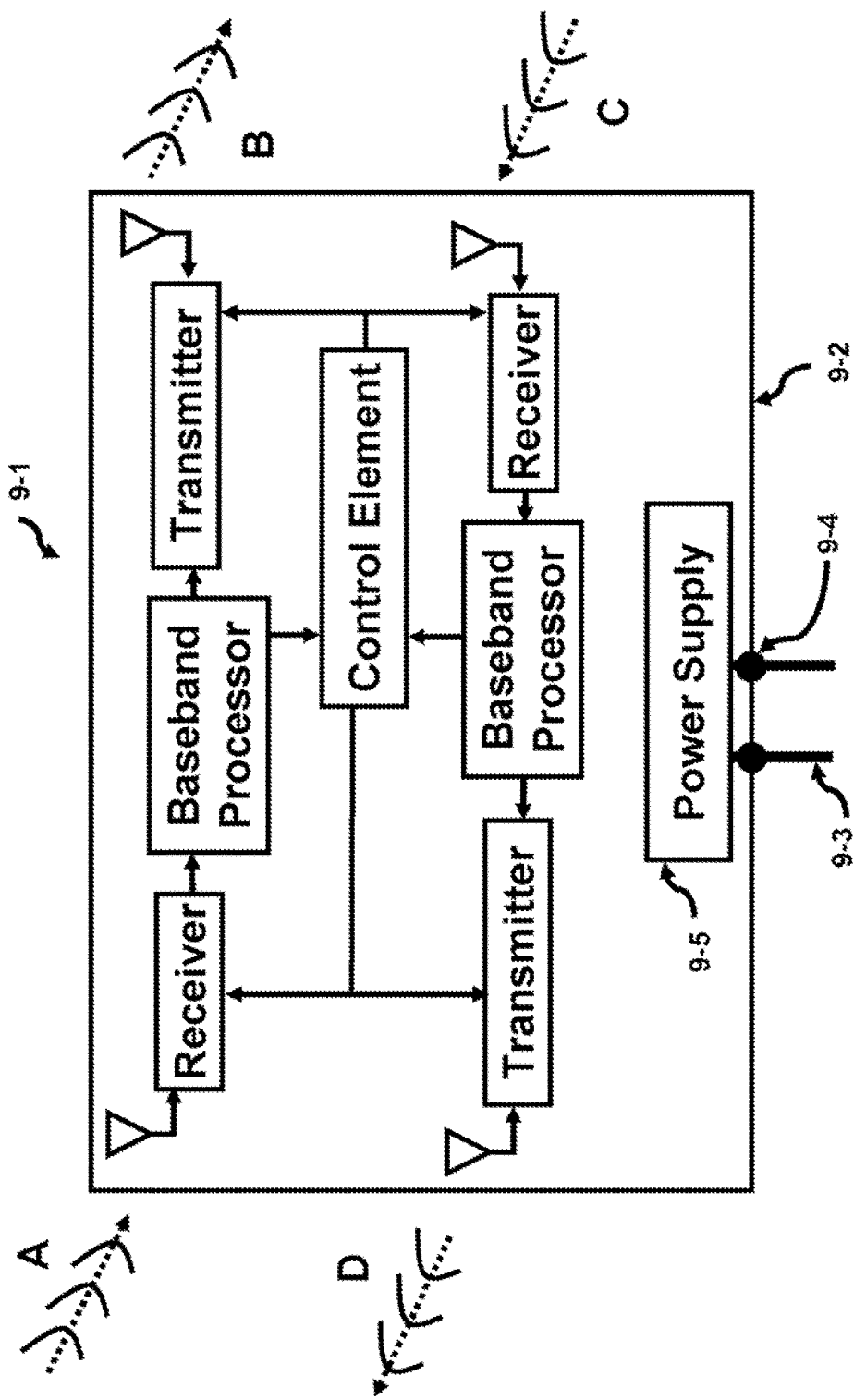
FIG. 9 housing unit containing a relay molded to a set of power plugs in accordance with the present invention.

FIG. 9 depicts a self-contained unit 9-1 that is a molded unit 9-2 containing a plurality of relays and power supply 9-5. The power supply 9-5 is connected to the power plugs 9-3 and the power supply plugs 9-3 are molded 9-4 into the housing unit 9-2. Thus, this unit can be plugged directly into a AC power wall outlet and the control unit can automatically determine its position in the ad-hoc network and provide service to the ad-hoc network.

Finally, it is understood that the above descriptions are only illustrative of the principles of the current invention. In accordance with these principles, those skilled in the art may devise numerous modifications without departing from the spirit and scope of the invention. For example, the relay may consist of several transceivers where each transceiver may use a different Communication Standard for communication, such as, Bluetooth, Wi-Fi 802.11, WiMAX, ZigBee, UWB, etc. One Communication Standard can be used for controlling the network, a different Communication Standard can be used to carry the stream of bits. Naturally, the numbers of transceivers within a relay can have several transceivers per each different Communications Standard. In some cases, the transceiver can be software controlled. In addition, each or all of the transceivers in a relay can be disabled to test the link integrity of the ad-hoc network.

What is claimed is:

1. An ad-hoc wireless network comprising:
   at least one client;
   a plurality of relays each in a known location; and
   a computational unit distributed within the ad-hoc network measuring a link integrity of each link in the ad-hoc wireless network; whereby
   the computational unit determines a placement of a new relay at a new location into the ad-hoc wireless network to improve the link integrity of the ad-hoc wireless network.

2. The network of claim 1 further comprising:
   a database comprising;
   locations of all the relays; and
   locations of all AC power plug outlets.

3. The network of claim 1 further comprising:
   at least one Internet connection.

4. The network of claim 1, wherein
   the computation unit communicates with the network using at least one Communication Standard.

5. The network of claim 1, wherein
   the link integrity of the network is measured by a bit error rate test result.

6. The network of claim 1, wherein
   the computational unit reconfigures the network to improve the link integrity.

7. The network of claim 1 further comprising:
   a visual display screen that displays the new location.

8. The network of claim 7, wherein the visual display screen exists on a mobile unit.

9. A method of improving a plurality of wireless links on an ad-hoc wireless network comprising the steps of:
   providing a database containing a location of all wall outlets within a range of the ad-hoc wireless network;
   inserting into the database the wall outlets that are coupled to a relay;
   distributing a computational unit within the network,
   measuring a wireless link integrity between nearest neighbor relays in the ad-hoc wireless network;
   determining the wireless link with a lowest integrity in the ad-hoc wireless network;
   mapping the wireless link to the database to determine a closest set of unused wall outlets; and
   positioning an addition of at least one relay coupled to the set of unused wall outlets;
   thereby improving the integrity of the wireless links in the ad-hoc wireless network.

10. The method of claim 9, wherein the wireless link integrity is measured by a result of a bit error test.

11. The method of claim 9, wherein the database is located in a client.

12. The method of claim 9 further comprising:
adding to the database
locations of all the relays and
locations of all AC power plug outlets.

13. The method of claim 9 further comprising the steps of:
making at least one Internet connection.

14. The method of claim 9, wherein the computation unit communicates with the network using at least one Communication Standard.

15. The method of claim 9, wherein the computational unit reconfigures the network to improve the link integrity.

16. The method of claim 9 further comprising:
displaying the additional relay on a visual display screen.

* * * * *